(12) United States Patent
Silva et al.

(10) Patent No.: US 9,156,718 B2
(45) Date of Patent: Oct. 13, 2015

(54) WASTEWATER TREATMENT SYSTEM

(71) Applicants: Robert F. Silva, Attleboro, MA (US); Stephen A. O'Connor, Ellenton, FL (US)

(72) Inventors: Robert F. Silva, Attleboro, MA (US); Stephen A. O'Connor, Ellenton, FL (US)

( * ) Notice: Subject to any disclaimer, the term of this patent is extended or adjusted under 35 U.S.C. 154(b) by 43 days.

(21) Appl. No.: 13/830,354

(22) Filed: Mar. 14, 2013

(65) Prior Publication Data
US 2014/0263047 A1 Sep. 18, 2014

(51) Int. Cl.
C02F 3/22 (2006.01)
C02F 3/20 (2006.01)
C02F 1/66 (2006.01)

(52) U.S. Cl.
CPC . C02F 3/223 (2013.01); C02F 3/20 (2013.01); C02F 1/66 (2013.01); C02F 3/22 (2013.01); C02F 2203/006 (2013.01); C02F 2203/008 (2013.01); Y02W 10/15 (2015.05)

(58) Field of Classification Search
USPC .................. 210/150, 220, 620, 629, 205–208
See application file for complete search history.

(56) References Cited

U.S. PATENT DOCUMENTS

| | | | | |
|---|---|---|---|---|
| 3,926,787 | A * | 12/1975 | Gay | 209/3 |
| 4,810,385 | A * | 3/1989 | Hater et al. | 210/606 |
| 5,160,286 | A * | 11/1992 | Hill | 441/80 |
| 5,779,890 | A * | 7/1998 | Bailey | 210/197 |
| 5,785,854 | A | 7/1998 | McKinney | |
| 6,145,815 | A * | 11/2000 | Cheng et al. | 261/93 |
| 6,514,410 | B1 * | 2/2003 | Gantzer | 210/605 |
| 6,780,318 | B2 * | 8/2004 | Fife et al. | 210/621 |
| 7,462,285 | B2 * | 12/2008 | Wickham | 210/607 |
| 7,513,995 | B2 | 4/2009 | James | |
| 7,658,851 | B2 | 2/2010 | Nelson et al. | |
| 8,110,107 | B2 * | 2/2012 | Wickham | 210/610 |

FOREIGN PATENT DOCUMENTS

JP 59147630 A * 8/1984

OTHER PUBLICATIONS

Johnson, Brian Sidney, Airlift Assisted Wastewater Treatment, Louisiana State University Department of Civil and Environmental Engineering Thesis, May 2008, 13pp.
Reinemann, D.J. & Timmons, M.B., Prediction of Oxygen Transfer and Total Dissolved Gas Pressure in Airlift Pumping, Aquacultural Engineering, vol. 8, 1989, 29-46, Elsevier Science Publishers Ltd., England.
Aquaworx Remediator product brochure by Infiltrator Systems, Inc., prior to Aug. 2012, 4 pp.
SludgeHammer product brochure, prior to Aug. 2012, 2 pp.
Knight Treatment Systems product brochures, Knight Treatment Systems, Inc., 2007, 6 pp.

* cited by examiner

*Primary Examiner* — Chester Barry
(74) *Attorney, Agent, or Firm* — Caseiro Burke LLC; Chris A. Caseiro

(57) ABSTRACT

A system for treating a fluid in a container. The system includes an included airlift tube and active air input into the tube. The air is supplied by a pump that is external to the tank and sized in accordance with the size of the tank. The system is arranged to promote the generation of suspended growth bacteria. The bacteria are provided by an air supply that is diffused in the tube wherein the air carries naturally occurring bacterial spores. The airlift tube includes one or more inlet ports located below an air diffuser. The tube may be located on the floor of the tank, suspended from the ceiling of the tank or arranged to float within the tank. A plurality of tubes may be used together to treat fluids in containers larger than standard septic tanks. A pH neutralizing device may form part of the system.

21 Claims, 5 Drawing Sheets

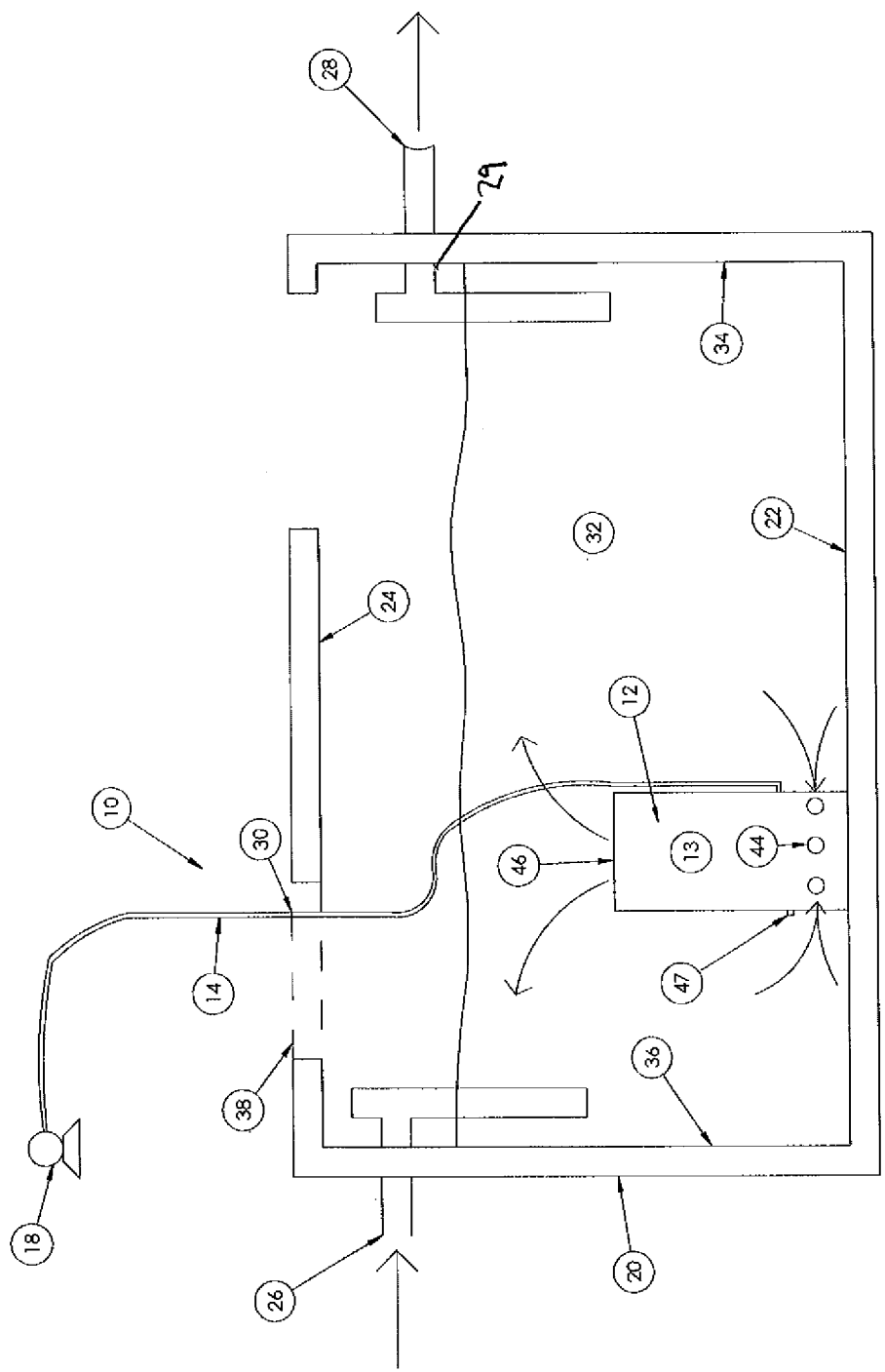

WASTEWATER TREATMENT SYSTEM

BACKGROUND OF INVENTION

1. Field of the Invention

The present invention relates to wastewater treatment. More particularly, the present invention relates to systems for treating wastewater including in septic tanks. Still more particularly, the present invention relates to wastewater treatment systems including airlift tubes.

2. Description of the Prior Art

Septic tanks and other sorts of wastewater treatment units are used to reduced the solids content of liquids prior to delivery to a fluid absorption field such as a leach bed. Some septic tanks are fairly stagnant in that incoming streams of solid and liquid waste are allowed to dwell in the tank until solids are separated from the liquid. The septic tank is configured so that the remaining effluent is allowed to flow to the absorption field, either directly or through a filter. Septic tanks with filtered outlets should be particularly effective at solids breakdown or removal to avoid filter clogging. Other types of septic tanks include active means for breaking down solids in the fluid prior to transfer to the absorption field. The present invention is directed to active septic tank systems.

Some active septic systems include the introduction of anaerobic bacteria to break down waste, a process which causes large particles of waste and sludge to remain within the septic tank or at least facilitates the transfer of solids to the absorption field. Other types of active septic systems force air into the tank to produce turbulence in the tank and to provide oxygen to aerobic bacteria. The aerobic bacteria sustained by air introduced into the tank interact with solids in the fluid and break them down but do so more quickly than in the systems that use anaerobic bacteria. Existing septic systems provide an anchor of sorts in the form of a bacteria retention medium to retain bacteria within the tank. These media have some porosity to enable bacteria growth therein and thereon. Septic systems including such media are referred to as fixed film systems. However, the growth media can become clogged over time whether by bacteria growth or other solids in the fluid, such as hair, for example, thereby reducing treatment efficiency and increasing maintenance requirements. It is desirable to provide the effectiveness of aerobic bacteria treatment without the limitations associated with the use of fixed film arrangements. Suspended growth systems provide oxygen for unanchored bacteria to grow.

Existing septic systems that include air introduction systems such as airlift arrangements include an airlift tube of fixed height. As a result, they are limited in their usage to septic tanks having a capacity of no more than 1500 gallons. Attempts to adjust the positioning of the tube in a larger tank include the addition of spacers under the tube. That haphazard fix in the turbulent environment of the tank can cause the tube to fall over and become substantially ineffective. It is desirable to have a system for treating wastewater in a septic tank or other containment tank that is configured to be functional for any container size.

Another limitation of existing systems is that they require the use of ballasting to keep them in a fixed position within the tank. It is desirable to have an airlift configuration that does not require ballasting so that it may be placed in a desirable location and moved, if desired, within the container. It would also be useful to be able to locate the airlift tube anywhere in the tank, including above the floor of the tank. Further, the effectiveness of the aerobic bacteria and the general performance of the septic tank are optimal when the pH in the tank is close to neutral. Unfortunately, there is a tendency for the fluid and contents entering the tank to be acidic. If that acidity is too much, the bacteria can be harmed and thereby rendered ineffective. It is desirable to ensure that the fluid in the tank remains close to neutral pH.

SUMMARY OF THE INVENTION

It is an object of the present invention to provide a system for treating wastewater, or other waste fluids, in an aerobic process. It is also an object of the present invention to provide a treatment system that limits or eliminates the chance of bacteria clogging without minimizing the efficiency of the bacterial action on the solids content of the waste fluid. Further, it is an object of the present invention to provide an airlift pump function in a septic tank or other waste fluid container that aerates the fluid effectively regardless of the size of the container. Yet further, it is an object of the present invention to provide an airlift pump based treatment system wherein the pump may be selectably positioned within the container.

These and other objects are achieved with a waste treatment system comprising a septic tank with an included airlift tube and active air input into the tube. The air is supplied by a pump that is external to the tank and sized in accordance with the size of the tank. The air is forced by the pump into a conduit associated with the tube and terminating in a diffuser or other form of porous structure. The system is arranged to promote the generation of suspended growth bacteria and with ports that are substantially larger than the pores of existing systems. The bacteria are provided by an air supply that is diffused in the tube wherein the air carries naturally occurring bacterial spores. These design features substantially eliminate the limitations associated with fixed film bacteria growth promotion and any other features that may result in clogging that can impact treatment effectiveness and increase maintenance requirements. Specifically, the airlift tube includes one or more inlet ports and one or more outlet ports that are large enough to ensure that any solids will pass through and not block those ports.

The inlet port or ports of the tube of the system may be positioned below the diffuser to maximize fluid flow through the tube. The tube is made of a material selected with a density greater than that of the fluid where it is located to make it negatively buoyant so that the tube remains on the floor of the tank while operational and without the need for ballast. A plurality of tubes may be deployed in a tank. The tube may be fabricated of selectable length to remain functional in tanks of a wide range of sizes, including, but not limited to tanks exceeding 1500 gallons. The tube includes a cross member extending through it, which cross member may be used to select positioning of the tube suspended above the floor of the tank in a selectable location. The tube optionally also includes a float element such as a ring of buoyant material circumscribing and attached to the perimeter of the tube so that it can float in the tank. The tube is configured to maintain fixed spacing from the diffuser within the tube to the surface of the fluid in the tank. This arrangement ensures that the fluid is turbulent enough to effect treatment of the fluid contents. The system further includes an optional pH regulating element that may be positioned within the tube or outside of the tube. The diffuser optionally includes a regulator, such as valve, to control the rate of air bubbling from the diffuser.

The system of the present invention extends the functional life of a septic system by reducing clogging conditions without compromising aerobic bacteria action. It is also effective at reducing the waste strength of effluent exiting the tank by, among other things, reducing fats, oils and grease in the effluent. That is accomplished by the turbulent action of the fluid caused by the air diffusion and the effective dispersion of the suspended growth bacteria. While the system of the present invention is suitable for residential and commercial septic systems, it is also suitable for use in other fluid containment systems to be treated including, but not limited to a mechanism to convert agricultural waste into fertilizer.

These and other features and advantages of the present invention will be understood upon review of the following detailed description, the accompanying drawings and the appended claims.

BRIEF DESCRIPTION OF THE DRAWINGS

FIG. 1 is a simplified partial cross-sectional side view of a fluid containment tank including a first embodiment of the fluid treatment system of the present invention.

DETAILED DESCRIPTION OF THE INVENTION

Figure 3:
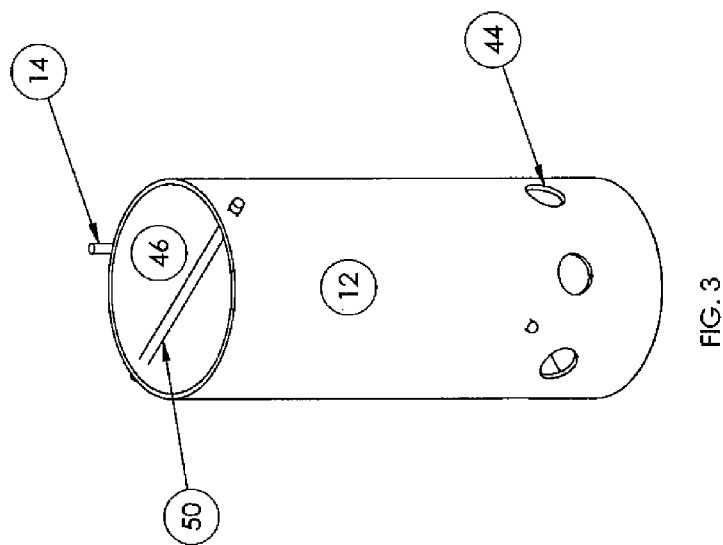
FIG. 3 is a perspective view of a first embodiment of the airlift tube of the treatment system.
Figure 4:
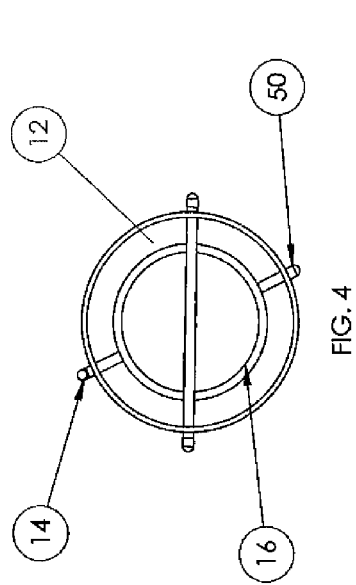
FIG. 4 is a top view of the first embodiment of the treatment system.
Figure 2:
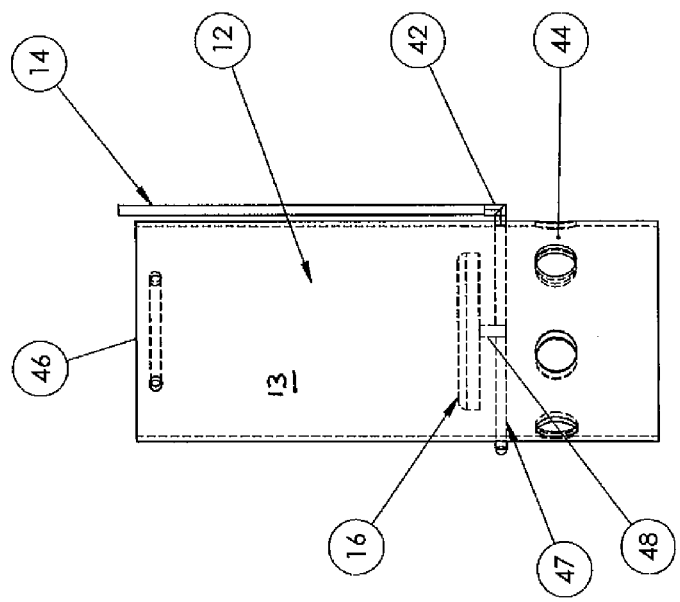
FIG. 2 is a side view of a first embodiment of the airlift tube of the treatment system.
Figure 5:
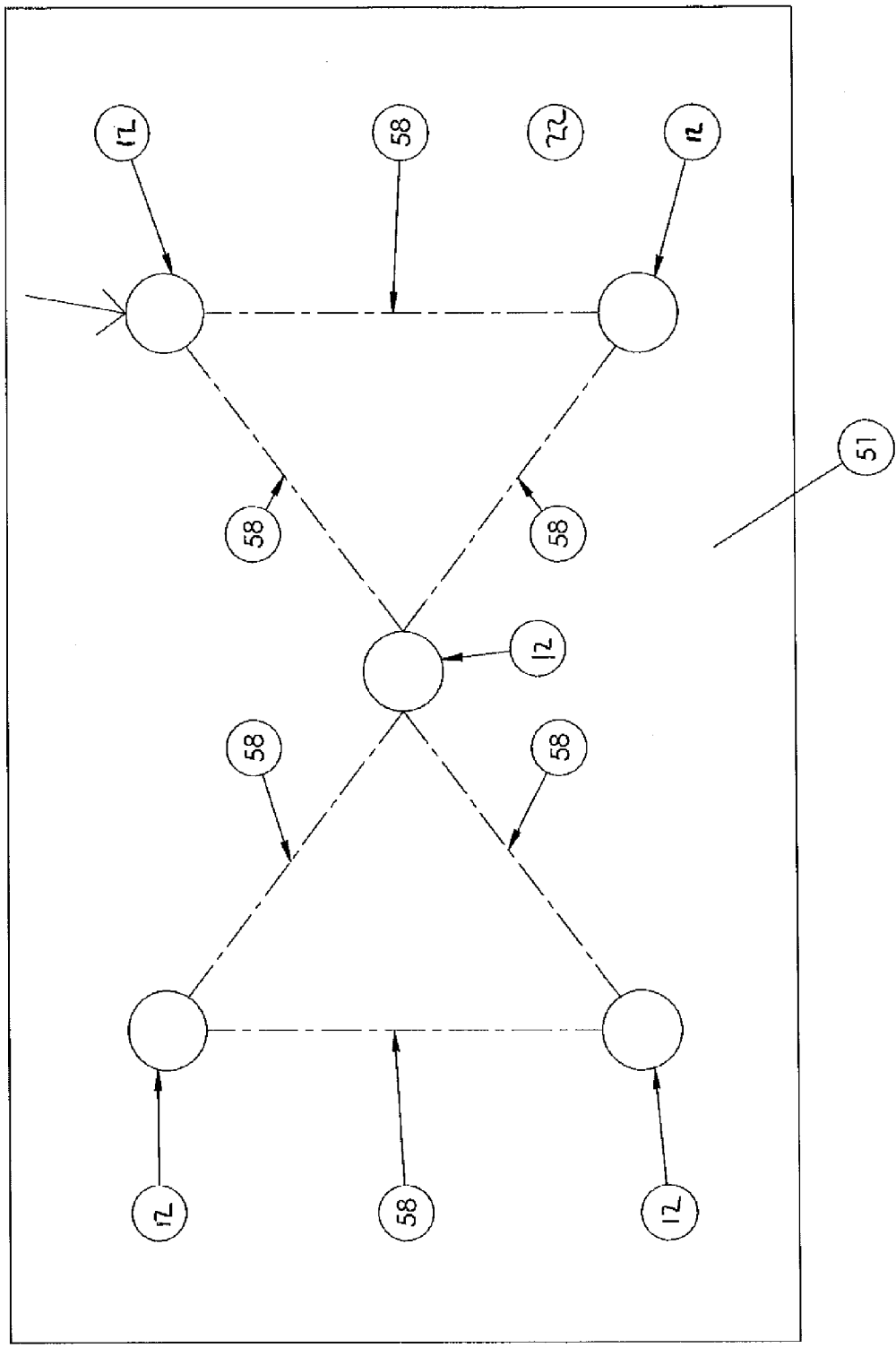
FIG. 5 is a plan view of an example of a tank including a plurality of airlift tubes as part of the treatment system.

A first embodiment of a treatment system 10 of the present invention is shown in FIGS. 1-4. The system 10 includes an airlift tube 12, an aeration conduit 14 extending on or in the tube 12, a diffuser 16 within the tube 12 and connected to the conduit 14, and a pump 18 connectable to the conduit 14. The pump 18 is selected to be suitable to pump about 40 liters of air per minute into the tube 14. A suitable pump for that purpose is the Model No. ET40 diaphragm pump available from Charles Austen Pumps Ltd. of Surrey, England. As shown in FIG. 5, the system 10 may optionally include a regulating valve 19 to regulate air flow into the conduit 14.

The system 10 can be used in any container with a fluid to be treated to modify or remove solids in the fluid so that the fluid may be transferred to a location for storage, dissipation or another function. The system 10 is described herein with respect to the use in treating a fluid in a commercial or residential septic tank but it is to be understood not to be limited thereto. An example simplified representation of the system 10 in situ is the system 10 in a septic tank 20. The septic tank 20 includes a septic tank floor 22, a septic tank ceiling 24, a septic tank inlet 26 and a septic tank outlet 28. The septic tank 20 includes an air conduit port 30 through which the aeration conduit 14 passes from outside the septic tank 20 to an interior region 32 of the tank 20. The port 30 is shown as passing through the ceiling 24; however, it may also pass through either of tank wall 34 or wall 36 if that is of use. The port 30 of the ceiling 24 may be part of a removable maintenance cover 38.

The airlift tube 12 provides for the treatment of fluid within the tank 20 with aerobic bacteria delivered into the tank with air from the aeration conduit 14. That is, naturally occurring bacteria that existing the atmosphere are delivered by the pump 18 into the tank 20 through the conduit 14 and the tube 12 to interact with the contents of the fluid entering the tank 20 through the inlet 26. The bacteria are provided by the system 10 substantially as suspended growth bacteria introduced by the air from the conduit 14 passing through the diffuser 16. Specifically, the air conduit 14 delivers air to the diffuser 16 where it is diffused to create small bubbles of air within the tube 12. An example of a suitable diffuser for the diffuser 16 is the Model No. 01798 fine-bubble diffuser available from Environmental Dynamics International of Columbia, Mo. The diffuser 16 includes an upper portion and a lower portion with a space between the two. The lower portion is removably connected to an air exiting end 42 of the conduit. The air enters the space between the upper and lower portions of the diffuser 16. The upper portion includes a plurality of pinholes through which the air in the space escapes into an interior 13 of the tube 12. The air exiting the diffuser 16 mixes with liquid in the interior of the tube 12, thereby exposing the liquid to treatment by contacting it with the suspended growth bacteria in the air.

As is known to those of skill in this field, the tube 12 operates as an airlift tube because the air of very low density and finely dispersed in the tube 12 by the diffuser 16 mixes with the liquid in the tube 12 thereby creating a low-density air-liquid fluid mixture. That fluid mixture, because of its low density, quickly rises to the top of the body of fluid within the tank 20 where the air of the mixture is separated from the liquid portion, which liquid portion mixes with other fluid in the tank 20. The transition from liquid density to air-liquid mixture density and back to liquid density causes the movement of the fluid into the interior 13 of the tube 12 through one or more fluid inlet ports 44. It also causes turbulence in the tank 20, which enhances bacteria contact with the fluid to be treated in the tank 20. In a tank that is a standard 1500-gallon septic tank, a tube such as the tube 12 with a height of about four feet and a diameter of about 14 inches, and a pump operating at about 40 liters of air per minute is sufficient to provide mixing adequate to treat the fluid prior to its exit through the outlet 28.

The tube 12 is fabricated of a material that is capable of operating for a reasonable period of time within the tank 20 in the conditions expected within the interior region 32 of the tank 20. The tube 12 may be made of a metallic material or a nonmetallic material. In an embodiment of the system 10, the tube 12 is fabricated of a nonmetallic material, such as a plastic material. The material of the tube 12 may have a density greater than that of the fluid within the tank 20. For example, if the fluid is primarily water, which has a density of about 1.0 grams per cubic centimeter, the tube 12 may be made of a material such as polyvinyl chloride, but not limited thereto, having a density of about 1.3 grams per cubic centimeter. Those of skill in the art will recognize that other materials are suitable. This greater density of the material of the tube 12 ensures that it will remain on the tank floor 22 without the need to add ballasting.

The tube 12 is advantageous in providing a suspended growth bacteria environment that is effective in treating the fluid. That effective functionality is maintained or enhanced by having the inlet ports 44 located below the diffuser 16 rather than at or above them. The diffuser 16 is positioned within the tube 12 with a bracket 47 that can be located where desired. The bracket 47 may be coupled to the conduit 14 and may include an interface stem 48 that may be removably affixed to the diffuser 16 such as with a screw-type arrangement or it may be permanently affixed to it, such as with an adhesive.

The tube 12 is preferably positioned within the tank 12 so that the opening 46 is roughly two inches below a surface of the fluid within the tank 20. That fluid surface is approximately equal to a bottom 29 of the septic tank outlet 28. This spacing provides sufficient volume to maximize fluid mixing.

For a 1500-gallon septic tank of typical dimensions, a 48-inch height of the tube 12 accomplishes that spacing. The tube 12 also optionally includes a cross member 50 extending through an upper region of the tube 12. The cross member 50 provides a device to facilitate movement of the tube 12 within the tank 20 to place it in a desired location, including to move it during maintenance.

As illustrated in FIG. 5, a plurality of tubes 12 may be used in the system 10 when the tank 20 volume exceeds about 1500 gallons. In that regard, one tube 12 is included in the tank 20 for each 1500 gallons of tank volume. In that version of the invention, each of the tubes 12 may be spaced from, and removably connected to, respective adjacent one or ones of other tubes 12 by a spacer bar 58. The arrangement of the tubes 12 when a plurality is used is selectable but should be configured to provide coverage throughout the tank 20 so that the mixing of liquid and air is as complete as possible.

Figure 6:
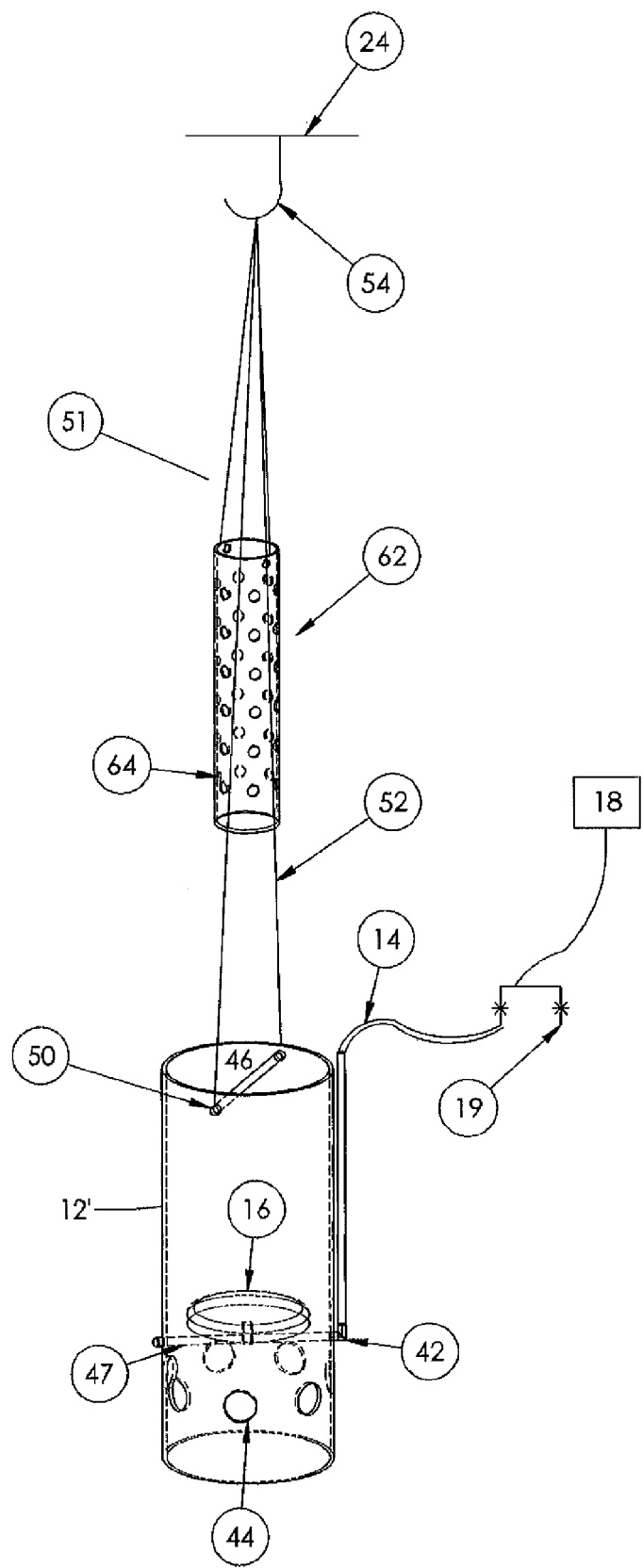
FIG. 6 is a side view of a second embodiment of the airlift tube of the treatment system.

Another embodiment of the invention is shown in FIG. 6. In it, the cross member 50 may be used to suspend tube 12' from the ceiling 24 of the tank 20. The tube 12' includes the same numbered components as shown in FIGS. 1-4 and further includes a suspension system 51 including a suspension cord 52 that may be joined to the cross member 50. The cord 52 may be fabricated of metallic or nonmetallic material. A hook 54 is joined to the cord 52 and may be hooked to a fixture located on the ceiling 24 of the tank 20 in a selectable location. This option of the tube 10' allows the use of a tube size that is constant, such as a tube that is four feet in height regardless of the height of the interior region 32 of the tank 20 provided the tube 10' is suspending so that the opening 46 is roughly two inches below the bottom 29 of the outlet 28 shown in FIG. 1, or, more generally, the tube 12' is positioned within its container so that its opening 46 is roughly two inches below the surface of the fluid treated.

Figure 7:
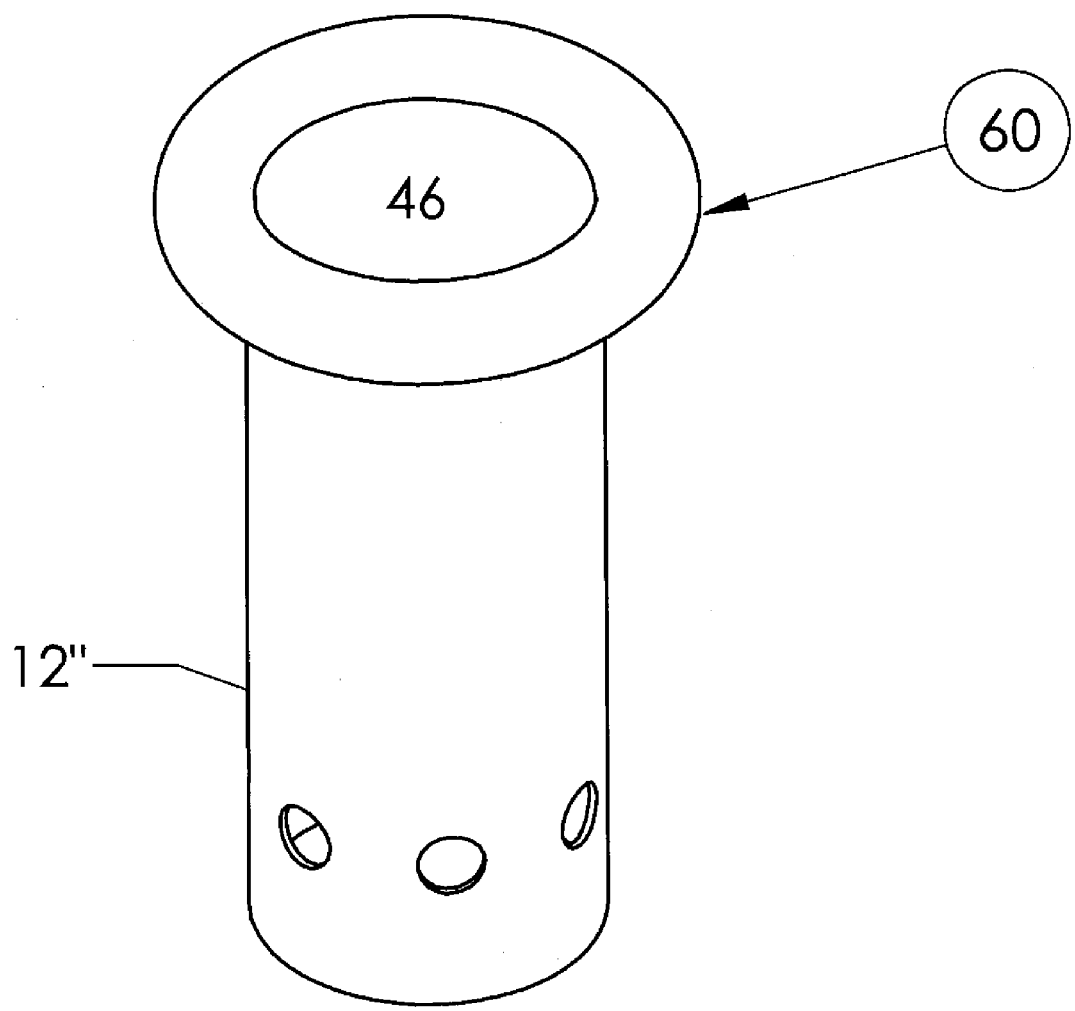
FIG. 7 is a perspective view of a third embodiment of the airlift tube of the treatment system.

Another option of the tube 12" suitable for use in tanks 20 of dimensions greater than 1500 gallons is shown in FIG. 7. The tube 12" is similar to the tube 12' of FIG. 6 in that it may be operational while above the floor 22 of the tank 20. However, whereas the tube 12' is fixed with respect to the ceiling 24, the tank 12" may move around within the interior region 32 of the tank 20. Specifically, the tube 12" includes a float 60, which is selected to be of sufficient buoyancy to cause the tube 12" to float in the fluid in the tank 20 provided the opening 46 of the tube 12" remains roughly two inches below the surface of the fluid to be treated. The float 60 may be in the shape of a ring, as shown, that circumscribes the exterior of the tube 12". It may be in a shape other than a ring and may be located within the tube 12" or somewhere other than at an upper region of the tube 12". The float 60 may be fabricated of a material sufficient to make the tube 12" buoyant while maintaining the indicated desired spacing between the opening 46 and the top of the fluid in the tank 20. The float 60 may be made of polyurethane or polyethylene foam bonded to the tube 12" but is not limited to those materials.

The system 10 further optionally includes a pH correction element 62 to aid in the regulation of pH within the tank 20. Regulating the pH within the tank so that the fluid is approximately of neutral pH reduces the risk of harm to the suspended growth bacteria within the tank 20. The pH correction element shown in FIG. 65 includes a porous basket 64 that may be removably coupled to the cord 52 or hooked directly to the fixture at the ceiling 24 of the tank 20. Alternatively, the basket 64 may be placed elsewhere in the tank 20. The basket 64 is arranged and configured to retain therein a material to neutralize acidic fluid. The neutralizing material may be sodium hydroxide (lime) such as lime chips.

The present invention includes a kit containing the tube 12, the conduit 14, the cross member 50, the diffuser 16, the bracket 47, instructions for installing the system 10 and, optionally, the pump 18 and the pH correction element 62. The instructions include: a) opening the tank 20 either through the cover 38 or before the ceiling 24 has been installed; b) placing the tube 12 in a selectable position within the tank 20 on the floor 22; c) inserting the bracket 47 into the tube 12 either before or after placing the tube 12 into the tank 20; d) placing the diffuser 16 on the bracket 47; e) inserting the conduit 14 into the tank 20; f) connecting the end 42 of the conduit 14 to the lower section of the diffuser 16; and g) connecting the other end of the conduit 14 to the pump 18. The pH correction element 62 may also be added. Once any other actions required in the tank 20 have been completed, the tank 20 may be closed and filled and the pump 18 activated when the initiation of treatment within the tank 20 is desired. It is to be understood that tube 12' or tube 12" may be used as replacements for tube 12. In the case of tube 12', the tube 12' is joined to the ceiling 24 rather than placed on the floor 22. In the case of the tube 12", the tube 12" may be placed on the floor 22 and allowed to float when the tank 20 is filled with fluid, or it may be inserted in the tank 12 with fluid already in there.

The system 10 of the present invention reduces the strength of the waste stream, including fats and oils, exiting the outlet 28, thereby increasing the life of the containment system, such as a septic system or a municipal sewer system. It saves any type of leach field, not simply trenches. It can also be used to convert agricultural waste into liquid fertilizer by concentrating nitrogen-based content within the container.

It is to be understood that various modifications may be made to the system 10 and the components described herein without departing from the spirit and scope of the invention. Accordingly, other embodiments are within the scope of the claims appended hereto.

What is claimed is:

1. A system for treating with suspended growth aerobic bacteria a fluid in a tank having a ceiling and a floor, the system comprising:
   a. a pump for pumping air;
   b. a conduit coupled to the pump for receiving air from the pump;
   c. one or more airlift tubes vertically positionable within the tank, wherein each of the one or more airlift tubes includes a tube interior and:
      i. a diffuser located within the tube interior, connected to the conduit and arranged to diffuse air into the tube;
      ii. one or more inlet ports positioned below the diffuser for receiving the fluid from within the tank; and
      iii. an opening above the diffuser, and
   d. a cross member extending through each of the one or more tubes,
   wherein each of the one or more airlift tubes is arranged to draw the fluid therein through the one or more inlet ports, through the diffuser and out through the opening and wherein the opening of the tube is positioned within the tank to be roughly two inches below a surface of the fluid in the tank.

2. The system as claimed in claim 1 wherein each of the one or more tubes is made of a material that is of greater density than a density of the fluid.

3. The system of claim 1 further comprising for each of the one or more tubes a cord attachable to the cross member and arranged to suspend the tube from the ceiling of the tank.

4. The system as claimed in claim 1 further comprising for each of the one or more tubes a float attached to the tube and arranged to float the tube in the fluid within the tank while remaining in a vertical position.

5. The system as claimed in claim 1 further comprising a pH correction element located within the tank.

6. The system as claimed in claim 5 wherein the pH correction element includes a retention basket for retaining a pH neutralizing material therein.

7. The system as claimed in claim 6 wherein the pH neutralizing material is lime.

8. The system as claimed in claim 3 further comprising
a retention basket removably attached to the cord, wherein the retention basket includes a lime pH neutralizing material therein.

9. The system of claim 1 comprising a plurality of the airlift tubes within the tank, wherein the plurality of airlift tubes are spaced from one another by one or more spacer bars.

10. An airlift tube for treating with suspended growth aerobic bacteria a fluid in a tank having a ceiling and a floor, the airlift tube vertically positionable within the tank, the airlift tube comprising:
   a. a tube interior;
   b. a diffuser located within the interior of the tube, connectable to a source of air and arranged to diffuse the air into the interior of the tube;
   c. one or more inlet ports positioned below the diffuser for receiving the fluid from within the tank;
   d. an opening above the diffuser; and
   e. a cross member extending through the tube and a cord attachable to the cross member and to the ceiling of the tank in an arrangement to suspend the tube from the ceiling of the tank,
   wherein the airlift tube is arranged to draw the fluid therein through the one or more inlet ports, through the diffuser and out through the opening and wherein the tube is configured for positioning in the tank so that the opening is roughly two inches below a surface of the fluid within the tank.

11. The tube as claimed in claim 10 made of a material that is of greater density than a density of the fluid.

12. The tube as claimed in claim 10, further comprising a float attached to the tube and arranged to float the tube in the fluid within the tank while remaining in a vertical position.

13. The tube as claimed in claim 10 further comprising a pH correction element located within the tank.

14. The tube as claimed in claim 13 wherein the pH correction element includes a retention basket for retaining a pH neutralizing material therein.

15. The tube as claimed in claim 14 wherein the pH neutralizing material is lime.

16. A kit for use in the treatment of a waste fluid in a tank having a floor and a ceiling, the kit comprising:
   a. one or more airlift tubes, wherein each of the one or more airlift tubes includes an opening;
   b. a diffuser for each of the one or more airlift tubes;
   c. an air conduit for each of the one or more airlift tubes;
   d. a diffuser bracket for each of the one or more airlift tubes;
   e. one or more cross members configured to extend through the one or more airlift tubes; and
   f. instructions for installing one or more of the one or more airlift tubes in the tank, wherein the instructions for each of the one or more tubes include:
      i. placing the tube in a selectable vertical position within the tank such that the opening of the tube is roughly two inches below a surface of the waste fluid in the tank;
      ii. inserting the bracket and the cross member into the tube;
      iii. placing the diffuser on the bracket;
      iv. inserting the conduit into the tank;
      v. connecting a first end of the conduit to the diffuser; and
      vi. connecting a second end of the conduit to a pump.

17. The kit of claim 16 wherein the instructions for installing include the step of placing one or more of the one or more tubes on the floor of the tank.

18. The kit of claim 16 wherein the instructions for installing include the step of connecting one or more of the one or more tubes to the ceiling of the tank.

19. The kit of claim 16 wherein the instructions for installing include the step of floating one or more of the one or more tubes in the tank while remaining in a vertical position.

20. The kit of claim 16 further comprising a pH correction element.

21. The kit of claim 20 wherein the pH correction element includes lime chips.

* * * * *